Figure 1:
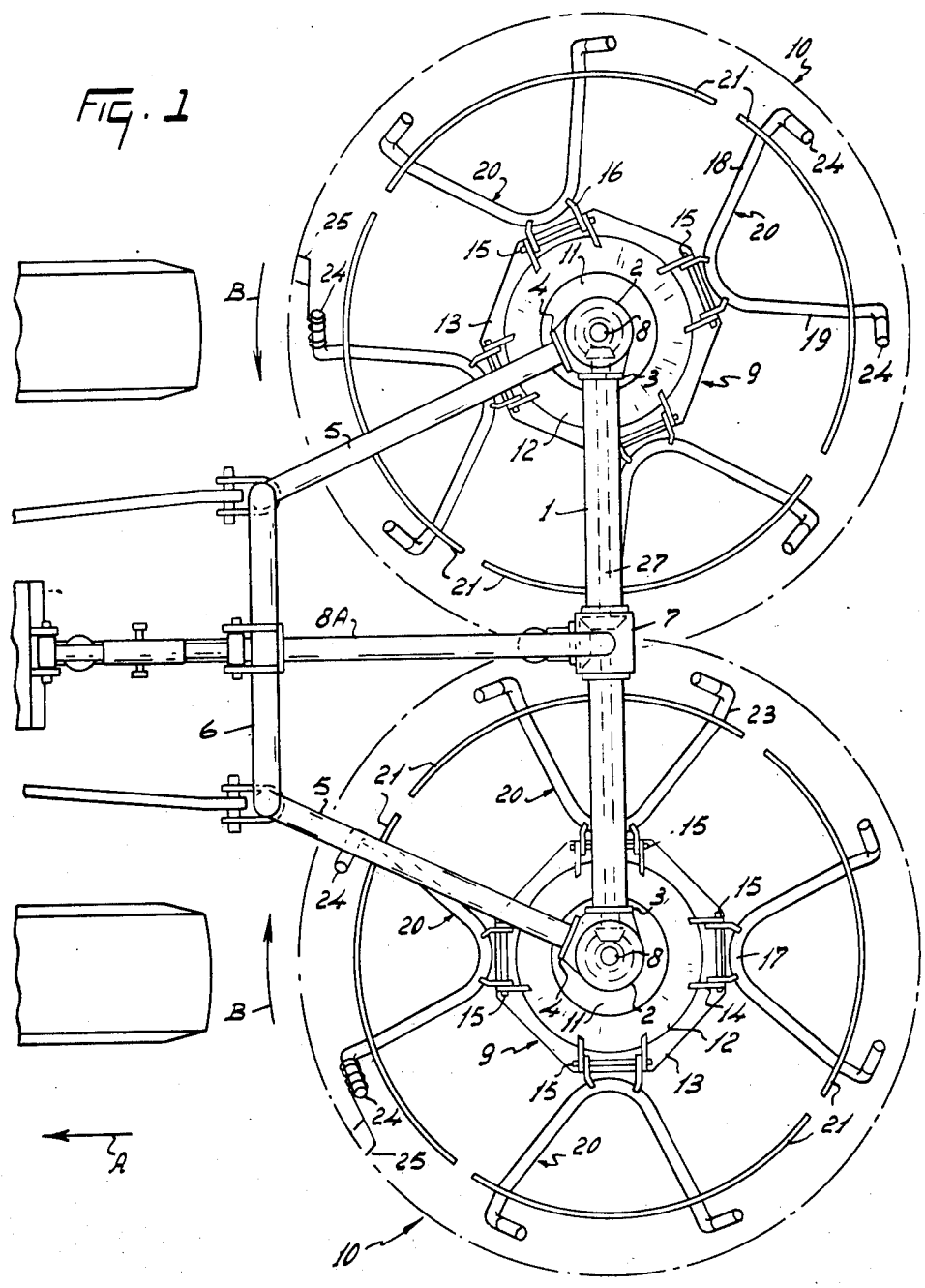

United States Patent [19]

van der Lely

[11] 4,020,620

[45] May 3, 1977

[54] HAYMAKING MACHINES

[76] Inventor: Cornelis van der Lely, 7, Bruschenrain, Zug, Switzerland

[22] Filed: Dec. 10, 1974

[21] Appl. No.: 531,436

[30] Foreign Application Priority Data

Dec. 12, 1973 Netherlands ...................... 7316979
Dec. 12, 1973 Netherlands ...................... 7316982
Dec. 12, 1973 Netherlands ...................... 7316983
Dec. 12, 1973 Netherlands ...................... 7316980

[52] U.S. Cl. .............................................. 56/370
[51] Int. Cl.² ........................................ A01D 79/00
[58] Field of Search ............ 56/365, 366, 370, 377; 172/59, 110, 111, 522; 16/18 R, 18 A, 21, 24–28

[56] References Cited

UNITED STATES PATENTS 3,075,231  1/1963  Rice ................................... 16/18 A
3,527,040  9/1970  Teagle ................................ 56/370
3,827,224  8/1974  Mulder ............................... 56/370

FOREIGN PATENTS OR APPLICATIONS 6,408,548  1/1966  Netherlands ........................ 56/370

Primary Examiner—Russell R. Kinsey
Attorney, Agent, or Firm—Mason, Mason & Albright

[57] ABSTRACT

A haymaking machine has at least one rake member mounted for rotation about an upwardly extending axis. Tines or groups of tines are supported around the circumference of the rake member on corresponding means that enables the tines to move up and down with respect to a central portion, independently of other tines supported on adjacent means. In one version, groups of tines are supported at the ends of outwardly extending arms which are pivoted to the central portion. The tines can be mounted with a ground engaging wall segment which subtends an angle of the rake member's circumference. Also the tines, or rake member as a whole, can be mounted on a shaft that is journalled at an angle in a ground engaging spherical wheel. In another version, the tines can be mounted on an elongated support element that is interconnected to the central portion and an adjustable ring on that portion, with chains that permit the tines to move vertically and radially with respect to the central portion.

25 Claims, 16 Drawing Figures

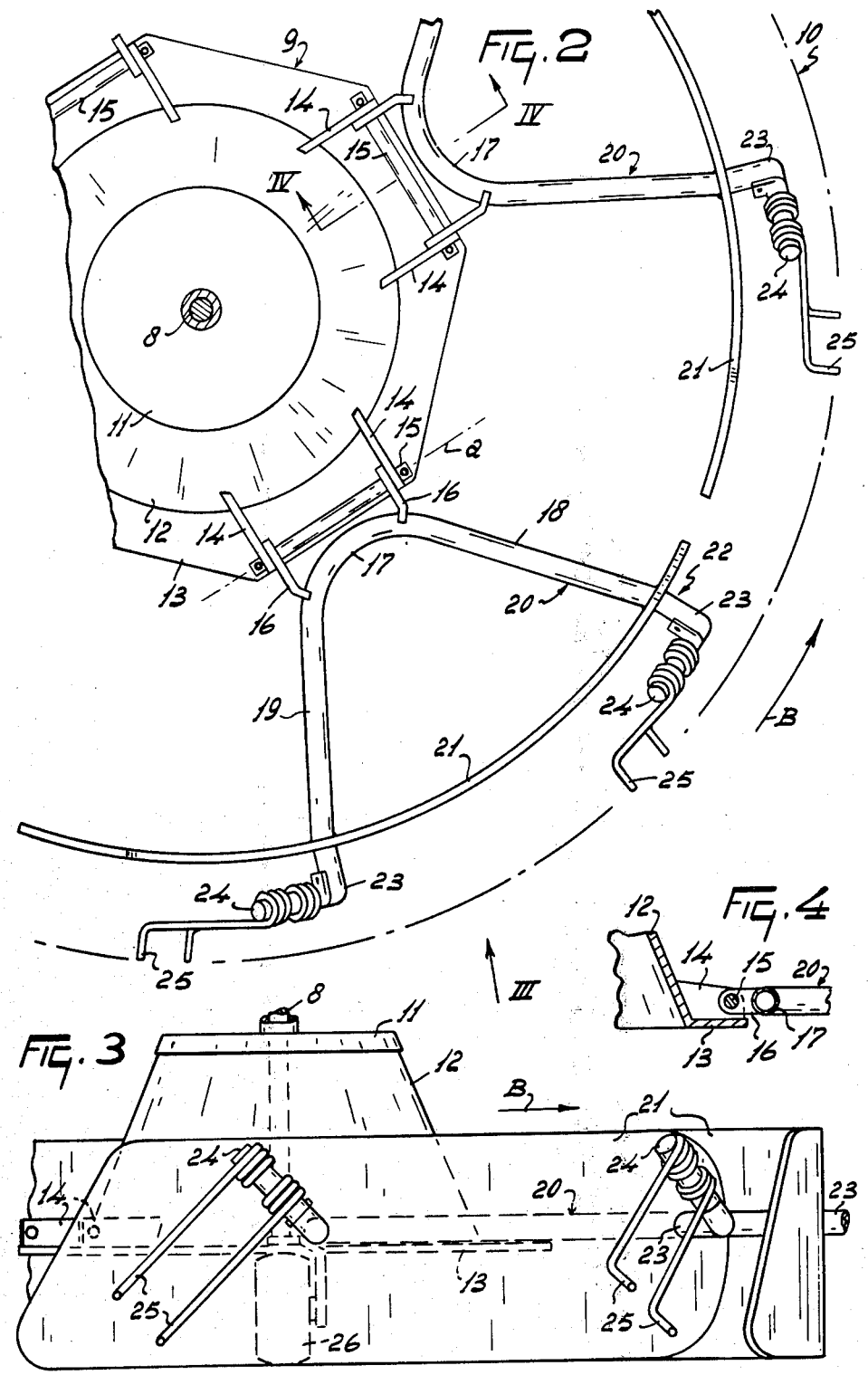

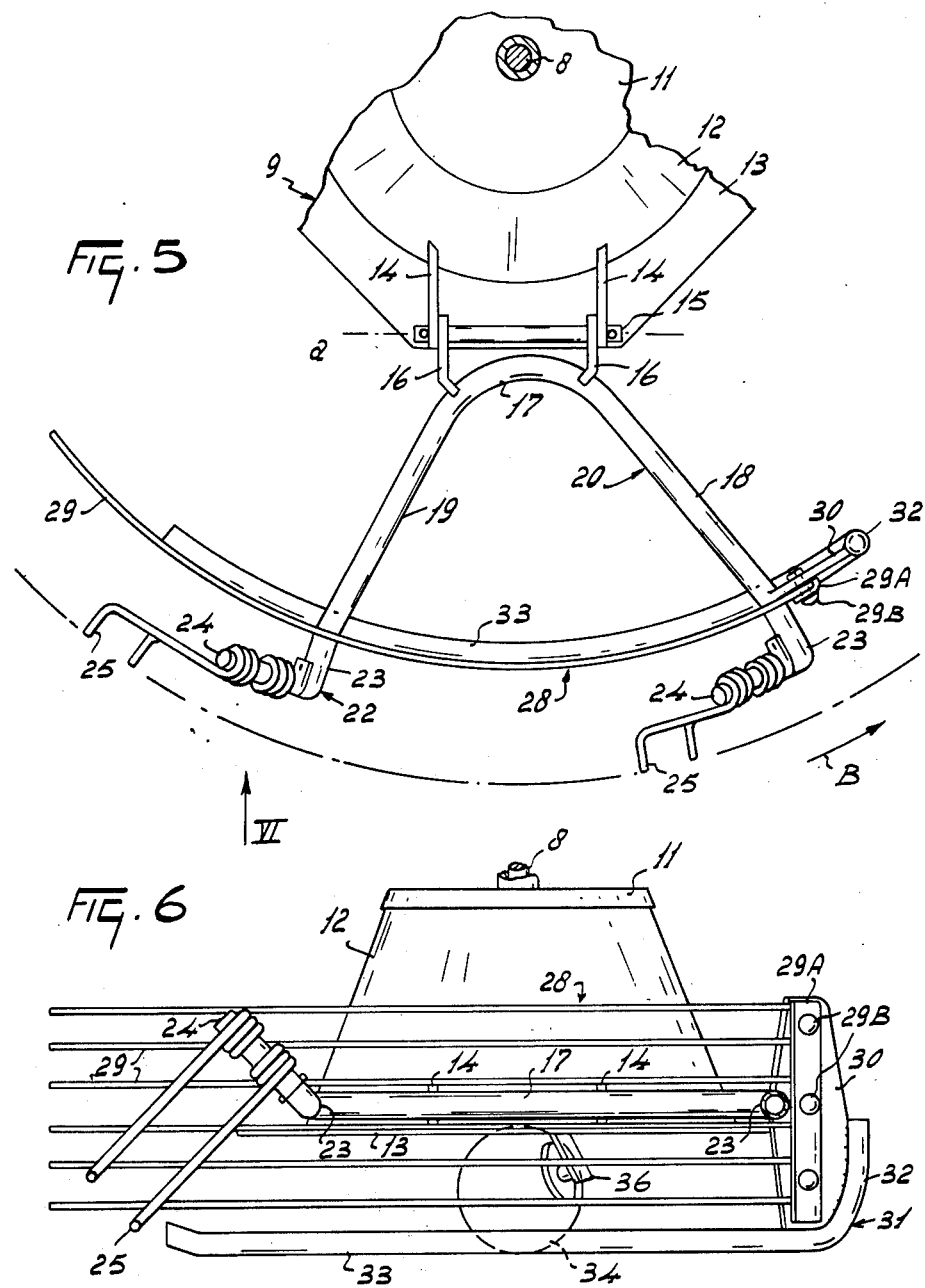

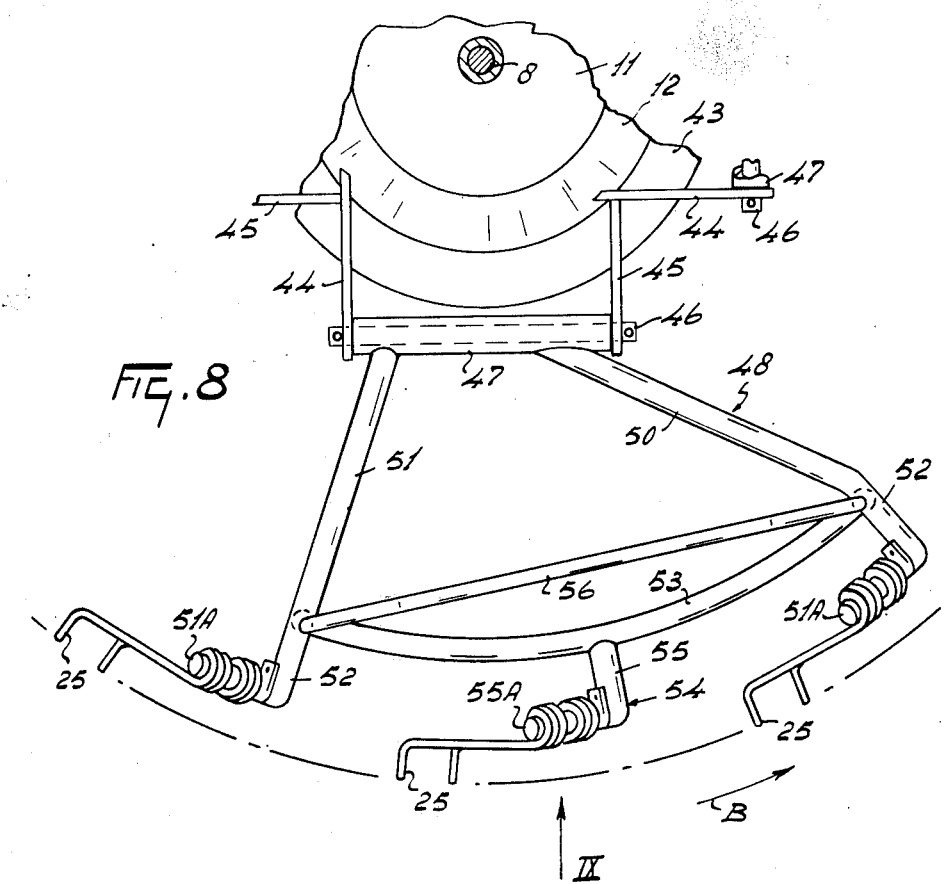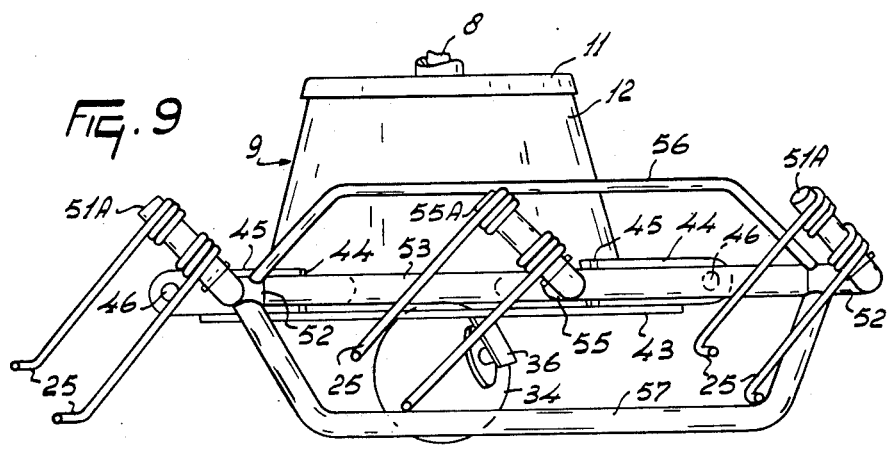

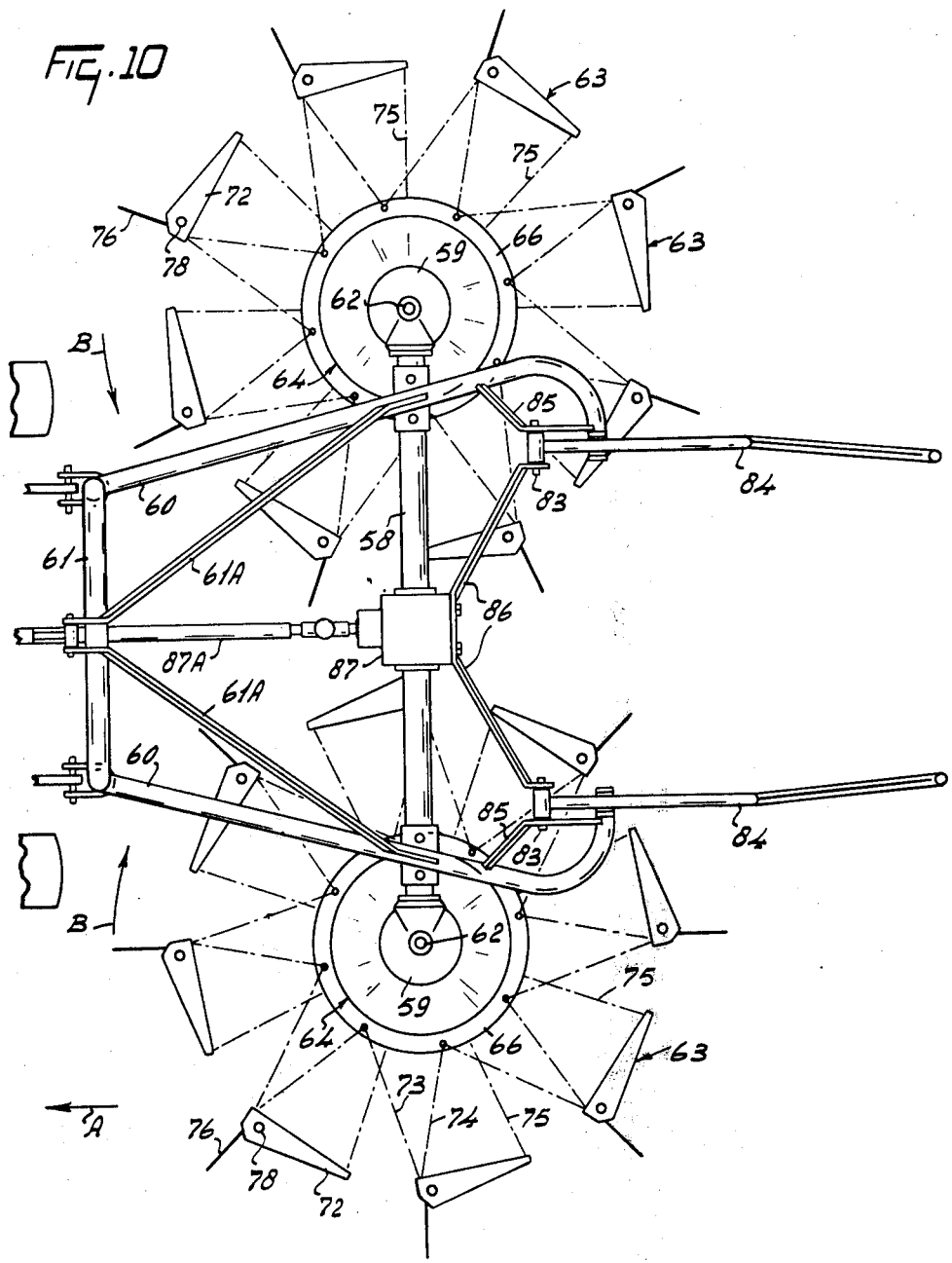

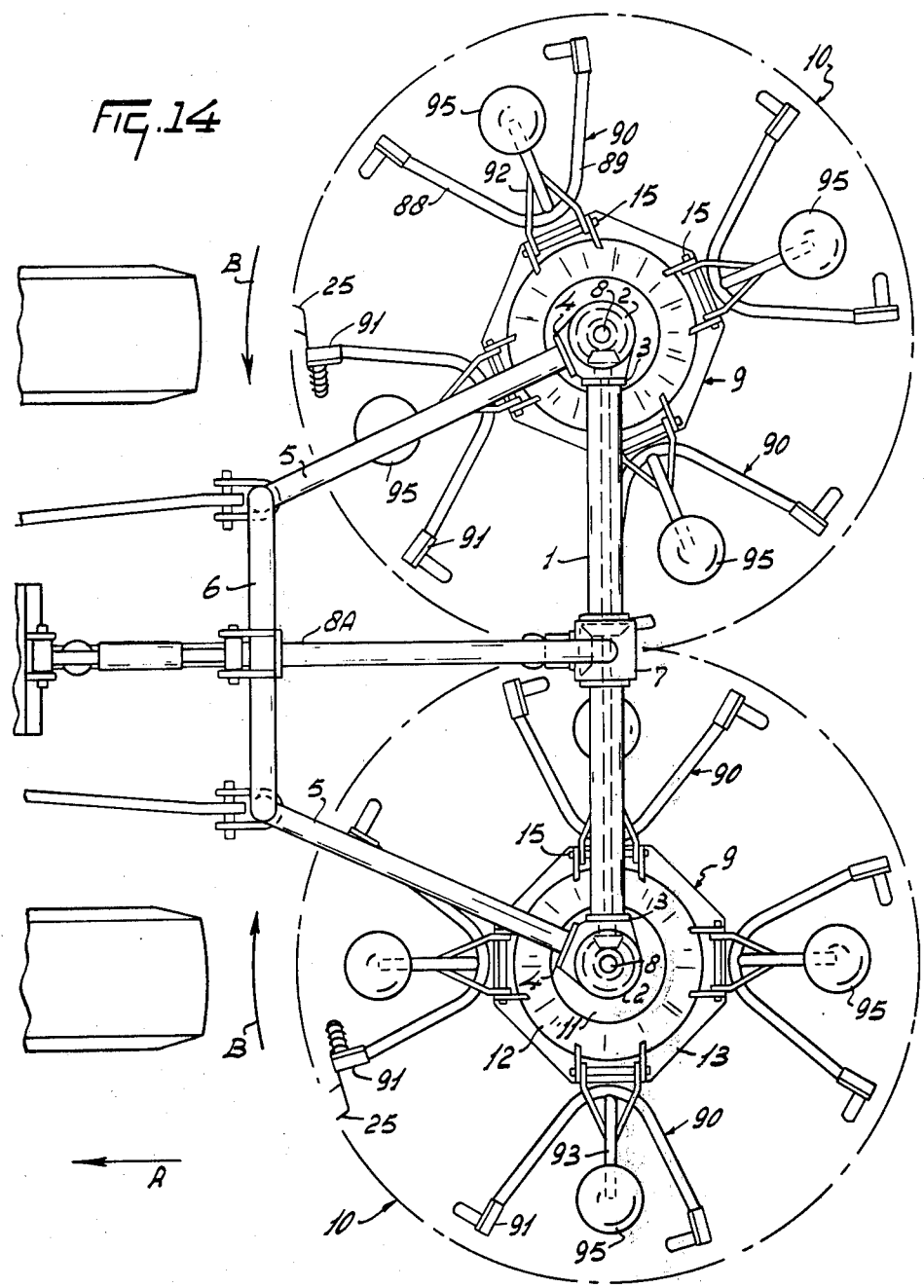

HAYMAKING MACHINES

Haymaking machines of the kind mentioned above involve the difficulty that, when large rake members of a diameter of about 59 inches to 79 inches are employed, such rake members having a comparatively large number of tines, somewhat complex constructions have to be used for the satisfactory matching of ground undulations so that the assembly is expensive and is susceptible to disturbances.

An object of the present invention is to provide a construction which permits the obtaining of effective conformity with the ground surface. The tines of each rake member can be divided into groups each of which covers a given circumferential angle of the rake member so that the number of pivotal connections required for allowing the upward and downward tine movements can be restricted while, in addition, those pivotal connections may be constructed so that they will readily resist the forces exerted on the tine groups in operation. The lifetime of the tine groups and their pivotal connections can thus be prolonged.

Figure 7:
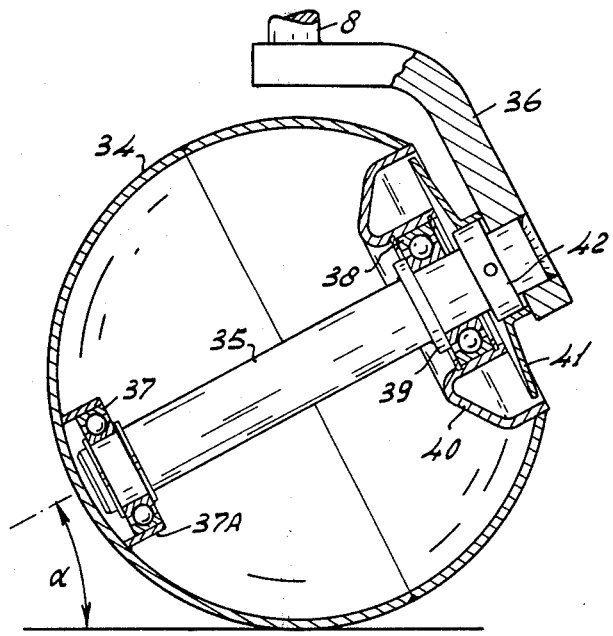
Figure 13:
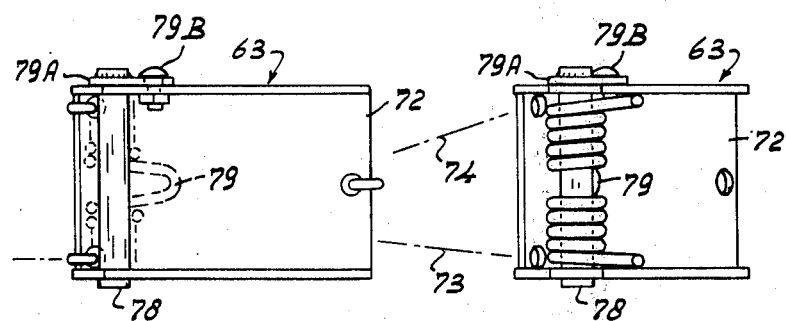
Figure 11:
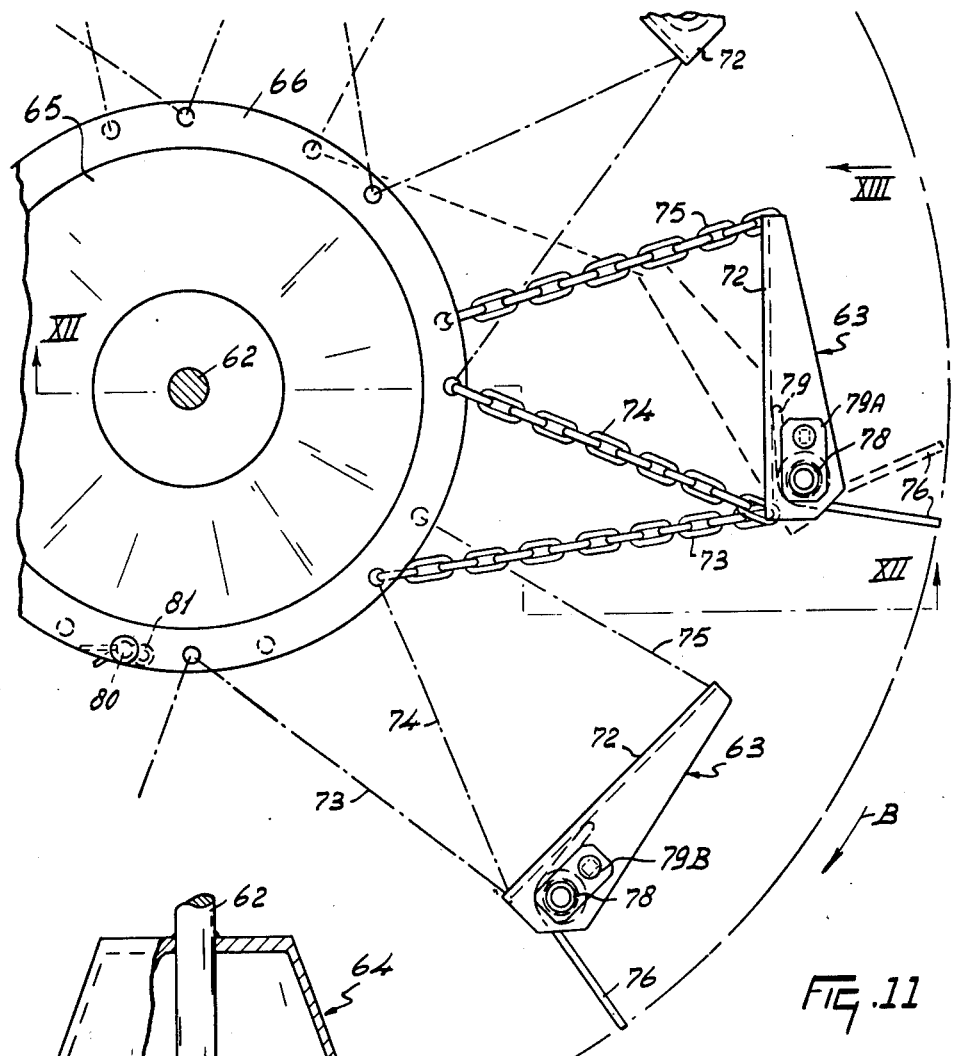
Figure 12:
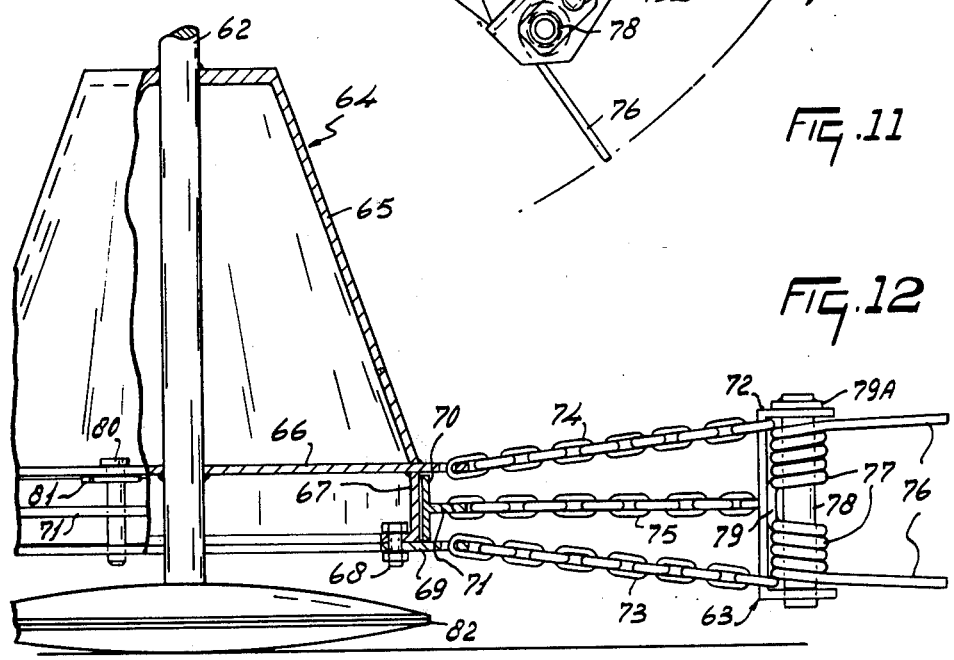
Figure 15:
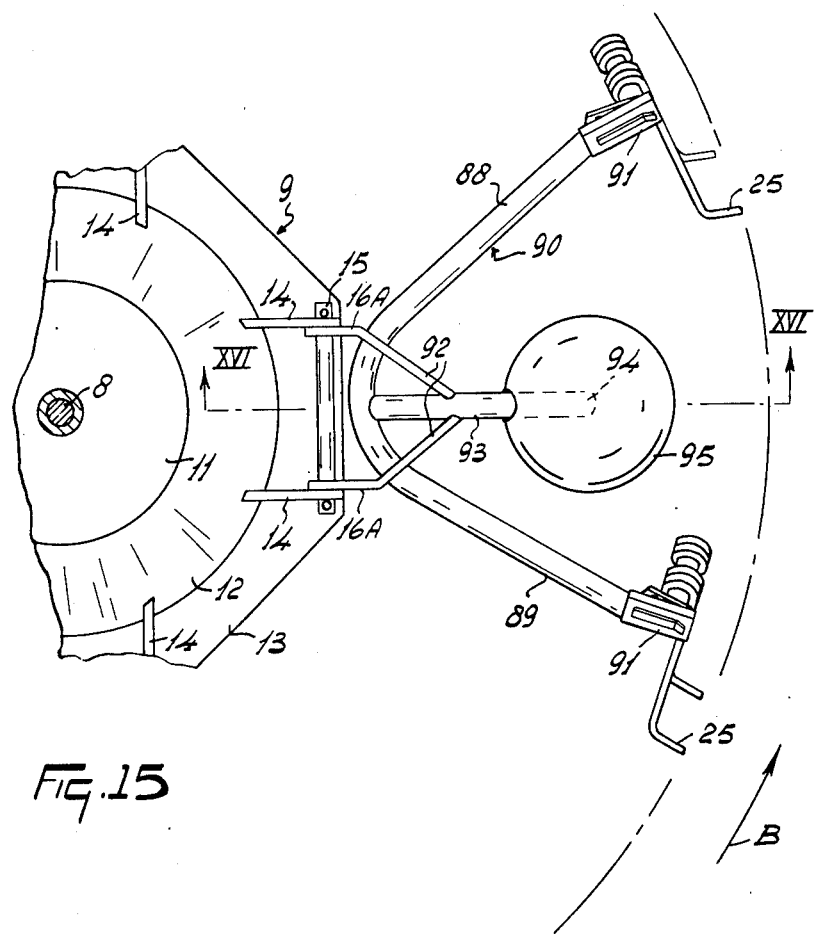
Figure 16:
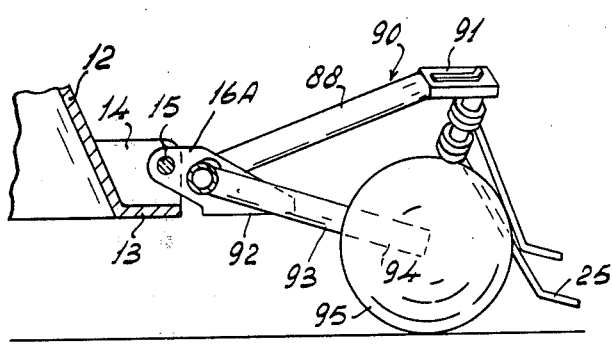

For a better understanding of the invention, and to show how the same may be carried into effect, reference will now be made, by way of example, to the accompanying drawings, in which:

FIG. 1 is a plan view of a haymaking machine in accordance with the invention connected to the rear of an agricultural tractor, FIG. 2 is a plan view, to an enlarged scale, illustrating the construction and arrangement of parts of a rake member of the machine of FIG. 1 in greater detail, FIG. 3 is an elevation as seen in the direction indicated by an arrow III in FIG. 2, FIG. 4 is a section taken on the line IV—IV in FIG. 2, FIG. 5 is a similar view to FIG. 2 but illustrates an alternative rake member construction, FIG. 6 is an elevation as seen in the direction indicated by an arrow VI in FIG. 5, FIG. 7 is a sectional elevation, to an enlarged scale, illustrating a substantially spherical supporting member of the rake member FIGS. 5 and 6 in greater detail, FIG. 8 is a similar view of FIGS. 2 and 5 but illustrates a further alternative rake member construction, FIG. 9 is a view as seen in the direction indicated by an arrow IX in FIG. 8, FIG. 10 is a plan view illustrating an alternative haymaking machine in accordance with the invention connected to the rear of an agricultural tractor, FIG. 11 is a plan view, to an enlarged scale, showing details of parts of one of the rake members of the machine of FIG. 10, FIG. 12 is a section taken on the line XII—XII in FIG. 11, FIG. 13 is an elevation as seen in the direction indicated by an arrow XIII in FIG. 11, FIG. 14 is a plan view illustrating a further alternative form of haymaking machine in accordance with the invention connected to the rear of an agricultural tractor, FIG. 15 is a plan view, to an enlarged scale, showing parts of one of the rake members of the machine of FIG. 14 in greater detail, and FIG. 16 is a section taken on the line XVI—XVI in FIG. 15.

Referring to FIGS. 1 to 4 of the drawings, the haymaking machine which is illustrated has a frame which comprises a hollow main beam 1 that extends substantially horizontally and transverse, and normally substantially perpendicular, to the intended direction of operative travel of the machine which is indicated in FIG. 1 and in other figures of the drawings by an arrow A. Two gear boxes 2 are secured to opposite ends of the main frame beam 1 by upright flanges 3 of said gear boxes. The gear boxes 2 also have further upright flanges 4 that face obliquely forwards with respect to the direction A and those flanges 4 are employed to connect the gear boxes to the rearmost ends of two forwardly convergent frame beams 5 whose leading ends are secured to the lowermost ends of the limbs of a coupling member 6 that is of substantially inverter U-shaped configuration. It is convenient, but is not essential, that the frame beams 5 and coupling member 6 be formed integrally from a single tubular beam appropriately bent to the desired shape. The coupling member 6 has two lower coupling points and a single upper coupling point by which the machine can be connected to the three-point lifting device or hitch at the rear of an agricultural tractor or other vehicle in the manner that is illustrated in FIG. 1. The hollow main frame beam 1 is provided, substantially midway along its length, with a gear box 7 and a tie beam 8A rigidly interconnects the top of that gear box 7 and the coupling member 6 close to the single upper coupling point thereof. As viewed in plan (FIG. 1), the tie beam 8A is substantially parallel to the direction A but, when seen in side elevation, the tie beam 8A is of curved configuration.

Each of the two gear boxes 2 accommodates a corresponding upright shaft 8 which may be considered as being substantially vertically disposed. The central portion or hub 9 of a corresponding rotary rake member 10 is arranged so that it can revolve around each shaft 8 and it will be seen from the drawings that each such central portion or hub 9 comprises a top plate 11 whose general plane is perpendicular to the axis of rotation defined by the corresponding shaft 8, each top plate 11 being supported by a corresponding rotary bearing that is not illustrated in the drawings. Each top plate 11 is located immediately beneath the corresponding gear box 2 and affords the upper of a corresponding frustoconical housing 12 whose lower end takes the form of a square plate 13 that is parallel to the top plate 11 and whose four corners are cut off so as to give the plate 13 eight straight edges rather than four. The upper surface of each bottom plate 13 is provided at the locations of its four excised corners with pairs of lugs 14, the lugs 14 of each pair being arranged in upright parallel relationship with the radially inner ends thereof secured to the corresponding housing 12 (see FIG. 4). A pivot pin 15 extends between the two lugs 14 of each pair in perpendicular and tangential relationship with the axis that is afforded by the corresponding shaft 8. Two further lugs 16 are pivotally mounted on one pin 15 between the two lugs 14 of each pair by means of the corresponding pivot pin 15, each pair of further lugs 16 being rigidly secured to a curved portion 17 of a supporting member 20. The curved portion 17 of each member 20 merges integrally into two substantially straight and outwardly divergent arms 18 and 19 which arms carry, near the circumference of the rake member 10 concerned, a wall segment 21. Each rake member 10 has four wall segments 21 and each of those segments is a corresponding arcuately curved plate whose center of curvature substantially coincides with the axis of the corresponding shaft 8.

The outer free ends of the arms 18 and 19 extend through the wall segments 21 and constitute tine supports 22 each of which comprises a substantially radial portion 23 and an upwardly inclined portion 24 which, as will be evident from FIG. 2 of the drawings, extends upwardly from the outermost end of the corresponding portion 23 in a rearward direction with respect to the intended direction of rotation of the rake member 10 concerned which direction is indicated in several of the Figures of the drawings by an arrow B. Each portion 24 carries a corresponding pair of tines 25 and it will be noted that each portion 24 is also arranged so as to be turnable about its own longitudinal axis relative to the corresponding portion 23 and to be retained in a chosen one of at least two different angular settings about that axis. This arrangement enables different dispositions of the tines 25 to be adopted and is not illustrated in detail in the drawings since it may be of any convenient kind that is known per se. The two tines 25 of each pair are made from a single length of spring steel wire or rod or other resilient material, said tines 25 incorporating helical coils that are disposed in surrounding relationship with the portion 24 of the corresponding support 22. Wire portions the coils of each pair of tines 25 can be secured to the portions 24 by transverse bolts or other clamping members that are not shown in the drawings. Straight portions of the tines 25 that adjoin the coils which have just been mentioned are parallel or substantially parallel to planes that are tangential to neighbouring regions of the wall segments 21, the relationship depending to some extent upon the particular angular settings of the tines 25 that are chosen about the axes of the support portions 24. Said portions of the tines 25 are straight throughout the greater parts of their lengths but it will be seen from FIGS. 2 and 3, in particular, of the drawings that free end regions of the tines are bent over through substantially 90° so as to extend outwardly with respect to the corresponding wall segments 21. The substantially straight portions of the tines 25 are substantially perpendicular to the axes of the corresponding support portions 24 and are inclined downwardly, and rearwardly with respect to the direction B, from said portions 24.

Each plate of one of the wall segments 21 has a leading edge, with respect to the direction B, that is smoothly curved (see FIG. 3) whereas its rearmost edge with respect to the same direction is upwardly and forwardly (also with respect to the direction B) inclined and merges into the upper and lower edges of the plate concerned by way of smooth curves. Each segment 21 is secured to the corresponding supporting member arm 18 at a location quite close to the leading edge of that segment with respect to the direction B and said segment is also secured to the arm 19 of the same supporting member 20 but, as seen in plan view (FIG. 2), the junction between the arm 19 and the segment 21 under consideration is spaced from the rearmost (with respect to the direction B) extremity of said segment 21 by a distance which is approximately equal to the distance between the junctions of the two arms 18 and 19 with the segment. The four segments 21 that correspond to each rake member 10 nearly adjoin each other so that an almost, but not completely, closed ring is formed around the corresponding shaft 8. Each segment 21 has a height which is equal to approximately one-quarter of its overall curved length in the direction B and it will be seen from FIG. 3 of the drawings that the junctions of the arms 18 and 19 with each segment 21 are located substantially midway between the uppermost and lowermost edges of the latter.

The lowermost end of each shaft 8 carries the mounting of a corresponding wheel 26 which is rotatable about a substantially horizontal axle and which, when the haymaking machine is in use, constitutes a rotary supporting member for the rake member 10 concerned. The gear box 7 that is located substantially midway along the length of the main frame beam 1 has a forwardly projecting rotary input shaft which is not clearly illustrated in the drawings but whose position can be seen in FIG. 1 thereof and bevel pinions located inside said gear box 7 transmit rotation applied to said input shaft to a drive shaft 27 that extends axially through the hollow main frame beam 1 and that is rotatably mounted therein. The opposite ends of the drive shaft 27 carry bevel pinions that are located inside the two gear boxes 2 and those bevel pinions cooperate which further bevel pinions which are carried by the housing 12 of the two rake members 10 in transmitting drive to both rake members to enable them to revolve in the opposite directions B that are shown in FIG. 1 of the drawings. The rotary input shaft of the gear box 7 is splined or otherwise keyed to enable it to be placed in driven connection with the power take-off shaft of an agricultural tractor or other operating vehicle through the intermediary of a telescopic transmission shaft that is of a construction which is known per se having universal joint at its opposite ends.

In the use of the haymaking machine that has been described with reference to FIGS. 1 to 4 of the drawings, its coupling member 6 is connected to the three-point lifting device or hitch of an agricultural tractor or other operating vehicle in the manner illustrated in outline in FIG. 1 of the drawings and the rotary input shaft of the gear box 7 is placed in driven connection with the power take-off shaft of the same tractor or other operating vehicle in the manner set forth above. The two ground wheels 26 bear rotatably on the ground surface and support the corresponding rake members 10. During normal operation, the two shafts 8 whose axes coincide with the two rake members 10 are not strictly vertically disposed but are inclined to the vertical by a few degrees in such a way that an upper region of each shaft 8 is a little further advanced with respect to the direction A than is a lower region thereof. As the machine is moved over a field of hay or other crop with two rake members 10 revolving in the opposite directions B that are indicated in FIG. 1 of the drawings, the hay or other crop is engaged by the tines 25 in leading regions of the two crop rake members 10 with respect to the direction A and is displaced rearwardly between the two rake members in a direction substantially opposite to the direction A. In this connection, it will be noted that the circles that are traced by the tips of the tines 25 of the two rake members 10 overlap one another in a region midway between the two shafts 8 and that the drive transmission to the two rake members 10 is arranged in such a way that the tines 25 of one rake member "intermesh" with the tines 25 of the other rake member thus avoiding fouling of the tines 25 in the central region of overlap. The tines 25 that correspond to each wall segment 21 are arranged in groups that each comprise two pairs of tines but which could, if desired, comprise more than two pairs of tines. The pairs of tines are located one behind the other with respect to the direction B and each group is turnable upwardly and downwardly about the longitudinal axis *a* (FIG. 2) of the corresponding pivot pin 15 independently of the other three tines groups of the same rake member 10. As will be evident from the preceding description, each axis *a* is substantially tangential to a circle centered upon the axis of the corresponding shaft 8 and it will be noted that the pivot pin 15 which affords each axis *a* has an effective length which is substantially equal to one-third of the distance between the outermost ends of the two arms 18 and 19 of the corresponding supporting member 20. The construction which has been described enables the tines 25 of the rake members 10 to follow undulations in the surface of the ground over which the machine is travelling in a smooth and effective manner even when each rake member 10 has a diameter that is larger than is customary for rake members of the same general kind and when the total number of tines carried by the rake member is large. The magnitude of each hinge connection include the parts 15, 14 and 16 is such, that the supporting members 20 and the parts which they carry are connected to the housing 12 of the corresponding rake member 10 in a reliable manner which is resistant to bending and breakage. Each of the groups of tines 25 bears upon the ground surface, during operation of the machine, by way of the lowermost edge of the corresponding wall segment 21. That edge follows undulations in the surface of the ground over which the machine is travelling because the two relatively spaced arms 18 and 19 of the corresponding supporting member 20 can pivot upwardly and downwardly without hindrance about the corresponding axis *a*. The smoothly rounded leading edge and the downwardly and rearwardly inclined rear edge of each wall segment 21 ensure that any hay or other crop which may be temporarily engaged by one of the wall segments 21, rather than by the tines 25, is quite quickly released. The upwardly and rearwardly orientated tine support portions 24 are also so arranged that hay or other crop will not tend to adhere to them for any great length of time. The tines 25 are very readily accessible when the machine is in its operative position so that, when required, any pair of tines can quickly and easily be replaced during only a short cessation of haymaking without it being necessary to return the machine to a farm workshop of the like.

When required, the tines 25 can be turned angularly about the axes of the corresponding support portions 24, with those portions, and may be retained in new settings appropriate to a different haymaking operation. For example, the dispositions of the tines 25 are advantageously changed when the machine is to undertake a swath-forming or other crop collection operation after having performed a tedding or other crop spreading operation or vice versa. As previously mentioned, the wall segments 21 form substantially, although not completely, closed rings around the corresponding shafts 8 and said segments ensure that crop displacement will proceed in a substantially undisturbed manner in the region of overlap between the two rake members 10 that can be seen in FIG. 1 of the drawings midway between the two shafts 8, this region of overlap having been discussed above. The wall segments 21 perform a screening function on this region. The supporting member arms 18 and 19 are substantially horizontally disposed during operation of the machine and it will be noted from FIG. 4 of the drawings that the bottom plates 13 of the housings 12 prevent excessive downward movements of the supporting members 20 about the axes *a* because their neighbouring edges act as stops barring downward movements of the further lugs 16 beyond a predetermined limit. When the machine is to be transported from one place to another without performing any haymaking or like operation, its overall width can be substantially reduced by tilting each supporting member 20 and the parts which it carries upwardly about the corresponding axis *a* until it bears upon the frusto-conical housing 12 of the rake member 10 concerned. It will be evident from FIG. 1 of the drawings that, when this position is adopted, the width of path of travel of the machine is only marginally greater than that of the tractor or other towing vehicle which precedes it in the direction A.

FIGS. 5 and 6 of the drawings illustrate a construction in which alternative wall segments 28 are employed, said wall segments 28 consists principally by arrays of resilient rods 29 that may conveniently be made from spring steel. Each array of rods 29 comprises a plurality, such as three, of integral pairs of rods each of which pairs has a hairpin-like configuration as seen in substantially radial elevation (FIG. 6). The integral pairs of rods 29 have the junctions between each pair secured to a corresponding upright plate 30 by bolts 29B and co-operating clamping plates 29A. Each upright plate 30 is secured to, or is integral with, the leading (with respect to the direction B) arm 18 of a corresponding supporting member 20 and it is thus the free ends of the rods 29 of each segment 28 that are rearmost with respect to the direction B. Each upright plate 30 also carries a corresponding tubular supporting member or shoe 31 which comprises an upwardly directed portion 32 that is welded or otherwise rigidly secured to the plate 30 and a substantially horizontal ground-engaging porton 33 whose rearmost free end, with respect to the direction, B, is bent over upwardly by a few degrees. The portion 33 of each supporting member or shoe 31 is arcuately curved in such away that its center of curvature substantially coincides with the longitudinal axis of the corresponding shaft 8 and this is, of course, also true of each of the similarly curved, but longer, rods 29, each rod 29 being contained in a substantially horizontal plane that is substantially perpendicular to the longitudinal axis of the corresponding shaft 8. Each rod 29 subtends an angle at the axis of the corresponding shaft 8 which is substantially the same as that subtended by each wall segment 21 at the same axis in the preceding embodiment, said angle thus having a magnitude of marginally less than 90°. Thus, as in the preceding embodiment, the four wall segments 28 of each rake member 10 afford a substantially, although not completely, closed ring around the central shaft 8 of that member.

The rake member 10 that is illustrated in FIGS. 5 to 7 inclusive of the drawings comprises, instead of the ground wheel 26, a substantially spherical supporting member 34 that may be considered as being a ground wheel although it does not have a conventional wheel shape. The member 34 is rotatable about the axis of a stub shaft 35 (FIG. 7), one end of said stub shaft 35 being fixedly secured to a support 36 carried at the lowermost end of the corresponding shaft 8. The lowermost and free end of the stub shaft 35 is located in an internal housing 37A of the spherical supporting member 34 and the housing 37A is rotatably connected to the stub shaft 35 by a ball bearing 37. A second ball bearing 38 rotatably connects an inwardly dished portion 40 of the member 34 to the stub shaft 35 close to the rigid mounting of that stub shaft on the support 36. As will be seen from FIG. 7 of the drawings, the inwardly dished portion 40 of the member 34 is recessed into the interior of that member, a screen 41 being provided to protect the bearing 38 and to close substantially the opening occupied by the portion 40. The inner race of the ball bearing 38 abuts against a shoulder 39 of the stub shaft 35 and the whole bearing lies between that shoulder and a safety ring 42 which is fastened to the stub shaft 35 alongside the support 36, said ring 42 also carrying the screen 41. The longitudinal axis of the non-rotary stub shaft 35 constitutes the axis of rotation of the spherical supporting member 34 and it will be noted from FIG. 7 of the drawings that said longitudinal axis is inclined to the horizontal by an angle $\alpha$ which has a magnitude of substantially 30°, a value of 27° being preferred. The longitudinal axis of the stub shaft 35 is contained in a substantially vertical plane that is substantially perpendicular to the direction A. The longitudinal axis of the shaft 8 that coincides with the axis of rotation of the rake member 10 intersects the longitudinal axis of the stub shaft 35 at substantially the center point of the spherical supporting member 34. The use of the spherical supporting member 34 in place of the ground wheel 26 enables lightweight materials to be employed in the construction of the machine while supporting the rake members in a satisfactory manner that provides good cooperation with the ground surface. Lateral forces tending to exert a deflecting effect upon the machine are satisfactorily resisted and driving of the machine through bends is facilitated.

FIGS. 8 and 9 of the drawings illustrate a rake member whose central portion or hub 9 has substantially the same construction as has been described above. However, in this case, the bottom of the frust-conical housing 12 is afforded by a circular plate 43 to which four pairs of strips 44 and 45 are secured in such a way as to produce a substantially cruciform pattern when all eight strips are viewed in a direction parallel to the corresponding shaft 8. The two strips 44 and 45 of each pair are parallel to one another and each strip 44 is a little longer that each strip 45, the arrangement being such that, moving around the plate 43 in the direction B, the short strip 45 of each pair bears against the long strip 44 of the next pair. The outermost free ends of each pair of strips 44 and 45 support a corresponding pivot pin 46 that is substantially horizontally disposed and in substantially tangential relationship with a circle centered upon the axis of the corresponding shaft 8. The pivot pins 46 extend substantially perpendicular to the axis of the corresponding shaft 8 and each of them is surrounded, between the supporting strips 44 and 45, by a pivotable sleeve 47. Each sleeve 47 forms part of a corresponding supporting member 48 which member carries a group of the tines 25 at its radially outermost periphery with respect to the corresponding shaft 8, there being three pairs of tines 25 per group in the embodiment illustrated in FIGS. 8 and 9 of the drawings although it is noted that each group may contain two pairs, or more than three pairs, of tines 25 if desired. As in the preceding embodiments, the pairs of tines 25 of each group are disposed one behind the other with respect to the intended direction of rotation B of the rake member concerned.

Each supporting member 48 comprises two arms 50 and 51 whose inner ends are both secured to the corresonding sleeve 47 but which arms are spaced apart from one another in the direction B. The leading arm 50 with respect to the direction B of each supporting member 48 is substantially tangentially disposed with respect to a circle centered upon the axis of the shaft 8 but the rearmost arm 51 with respect to the same direction is substantially radially disposed relative to the same axis. An outermost end region of each arm 50 is bent rearwardly to form a substantially radially extending portion 52. Each arm 51 also has an outermost substantially radial portion 52 but this portion is not bent over relative to the remainder of the arm 51.

The radially extending outermost ends of the portions 52 of the arms 50 and 51 carry relatively perpendicular and upwardly and rearwardly (with respect to the direction B) inclined arm portions 51A that are similar in construction and function to the previously described upwardly inclined arm portions 24. One pair of tines 25 is carried by each portion 51A and, as in the preceding embodiments, each arm portion 51A is angularly displaceable about its own longitudinal axis relative to the corresponding substantially radial arm portion 52 and is provided with means, not shown, in detail in the drawings, to enable it to be retained in a chosen one of at least two different angular settings about that axis. The two arms 50 and 51 of each supporting member 48 are coupled together by a connecting part 53 that is of arcuately curved configuration and whose center of curvature substantially coincides with the axis of the corresponding shaft 8. The connecting part 53 extends between the junction of the radial portion 52 with the remainder of the corresponding arm 50 and an equivalent location on the arm 51. Substantially midway along its length, each connecting part 53 is provided with a tine support 54 which comprises a substantially radial portion 55 and an upwardly and rearwardly (with respect to the direction B) inclined portion 55A, said portion 55A being provided with a corresponding pair of the tines 25 and being adjustably mounted in an identical manner to the arm portions 51A that have been mentioned above. The longitudinal axes of the two radial portions 52 and the single radial portion 55 of each supporting member 48 are all substantially coplanar.

A bracket 56 interconnects the junctions between the radial portions 52 of the two arms 50 and 51 and the remainders of those arms and it will be seen from FIG. 9 of the drawings that said bracket 56 comprises two limbs that are steeply convergent in an upward direction and a crossbar integrally interconnecting the upper ends of said limbs. The whole bracket 56 is contained in a substantially vertical plane that is normally substantially parallel to the axis of the corresponding shaft 8 and its crossbar is contained in a substantially horizontal plane that is substantially parallel to a plane containing the center line of the curved connecting part 53 of the supporting member 48. As viewed lengthwise of the corresponding shaft 8 (FIG. 8), the bracket 56 appears straight and is tangential to a circle centered upon the axis of said shaft 8. A further bracket 57 that is made from heavier material than the bracket 56 also interconnects substantially the same points on the two arms 50 and 51 as does the bracket 56 but the bracket 57 extends downwardly below the general plane of the arms 50 and 51 and the connecting part 53. The further bracket 57 comprises two limbs that are downwardly convergent to a somewhat less steep extend than the limbs of the bracket 56 and an integrally interconnecting crossbar whose center line is contained in a substantially horizontal plane that is parallel to a substantially horizontal plane containing the center line of the connecting part 53 of the supporting member 48. Thus, it will be realised that the center line of the whole further bracket 57 is contained in a cylindrically curved surface which also contains the center line of the connecting part 53 whereas the centre line of the whole brackets 56 is contained in a substantially vertical plane. The central axis of curvature of the imaginary curved cylindrical surface that has just been mentioned substantially coincides with the longitudinal axis of the corresponding shaft 8. The upper brackets 56 and lower bracket 57, and to some extent the connecting parts 53, of the four supporting members 48 constitute wall segments located in a circumferential region of the corresponding rake member. As in the preceding embodiments, the four wall segments together form a substantially, but not completely, closed ring around the axis of the corresponding shaft 8.

A haymaking machine similar to the machine illustrated in FIG. 1 of the drawings but comprising two rake members 10 of the kind that have been described with reference to FIGS. 8 and 9 of the drawings is capable of following undulations in the ground surface over which the machine travels, during operation, in a very effective manner since it comprises four groups of the tines 25 each of which groups has three pairs of tines that are arranged one behind the other with respect to the direction B. Each of the four groups is capable of turning upwardly and downwardly relative to the central housing 12 of the corresponding rake member, independently of the other three groups, about the axis that is defined by the corresponding pivot pin 46. The operation is generally similar to that which has been described above but, as previously mentioned, each wall segment in this embodiment is afforded principally by the corresponding upper and lower brackets 56 and 57 together with, to a less important extent, the corresponding connecting part 53. The wall segments again serve a screening function in the region of overlap between the circles that are traced by the tips of the tine 25 of the two rake members of the machine during its operation and it will be realised that the curved crossbars of the lower brackets 57 contact the ground surface constantly or intermittently during operation thus governing the level of the corresponding tines 25 relative to the ground surface. The upper brackets 56 positively prevent the corresponding tines 25 from fouling the frame beams of the machine in the event of excessive upward deflections of the corresponding wall portions which, in the absence of the upper brackets 56, might cause damage to the tines 25 and other parts of the machine as will be evident from a study of FIG. 1 of the drawings. Each of the hinge connections between the supporting members 48 and the corresponding lugs 44 and 45 that is afforded principally by one of the pivot pins 46 and the corresponding sleeve 47 again has an effective length which is sufficient to resist strongly forces tending to bend each supporting member 48. The effective length of each hinge connection in this embodiment has a magnitude which is equal to substantially half the maximum distance between the corresponding arms 50 and 51.

FIGS. 10 to 13 of the drawings illustrate a haymaking machine having a frame which comprises a substantially horizontal main frame beam 58 of hollow construction that extends substantially perpendicular to the intended direction of operative travel A of the machine. Two gear boxes 59 are secured to the opposite ends of the main frame beam 58 and two frame beams 60 that are horizontally or substantially horizontally disposed are gently convergent in a forward direction with respect to the direction A from rigid connections with the main frame beam 58 that are located close to the two gear boxes 59. The leading ends of the two frame beams 60 are rigidly secured to, or are integral with, the lower ends of the limbs of an upright coupling member 61 of substantially inverter U-shaped configuration. The coupling member 61 comprises two lower coupling points and a single upper coupling point that are arranged to co-operate with the three-point lifting device or hitch of an agricultural tractor or other operating vehicle in the manner that is illustrated in outline in FIG. 10 of the drawings. The two frame beams 60 also extend rearwardly from the main frame beam 58 beyond their rigid connections therewith and, at a distance behind the frame beam 58, are bent over to form smooth curves in such a way that the free ends of those curves face each other. Strengthening strips 61A rigidly interconnect the single upper coupling point of the coupling member 61 and locations on top of the two beams 60 that adjoin the rigid connections of those beams to the main frame beam 58.

Each of the two gear boxes 59 holds a corresponding upright shaft 62 which may be considered as being substantially vertical although it will actually be inclined to the vertical by a few degrees when the machine is in operation. In this case, the two shafts 62 both revolve during the use of the machine and their longitudinal axes coincide with the axes of rotation of two corresponding rake members 63. As will be evident from FIG. 12 of the drawings, each shaft 62 carries a central portion or hub 64 of the corresponding rake member 63 secured to it, said central portions or hubs 64 being afforded principally by frust-conical housings 65 whose central axes coincide with the longitudinal axes of the two shafts 62. The bottom of each housing 65 is afforded by a corresponding circular plate 66 from the lower surface of which depends a ring 67 whose upper edge is rigidly secured to the plate 66. The ring 67 has an inwardly directed perpendicularly bent-over rim at its lower edge. Bolts 68 are employed to fasten an annulus 69 to the lower surface of the rim of the ring 67 in such a way that the general plane of the annulus 69 is parallel to that of the overlying plate 66. The outer edges of the plate 66 and the annulus 69 lie at equal distances from the longitudinal axis of the corresponding shaft 62 and their centers of curvature coincide with that axis. An adjustable ring 70 surrounds the outer surface of the ring 67 between the overlying plate 66 and underlying annulus 69. The adjustable ring 70 has an outwardly directed projection 71 midway between its uppermost and lowermost edges, said projection 71 being substantially parrallel to the plate 66 and annulus 69 and being formed with a plurality of holes.

The circumference of each rake member 63 is provided with a plurality, such as eight, of tine support plates 72 each of which is of channel-shaped cross-section with the web or base of the channel substantially vertically disposed and the limbs thereof substantially horizontally disposed in vertically spaced apart relationship, (see FIG. 12). The two limbs of each support plate 72 project outwardly away from the web or base thereof and are substantially perpendicular to the axes of the corresponding shafts 62, the webs or bases of said support plates 72 being substantially parallel to those axes nd also being substantially tangential to imaginary right circular cylindrical figures whose longitudinal axes coincide with those of the shafts 62. The support plates 72 are connected to the central portions or hubs 64 of the rake members 63 by flexible but inextensible members in the form of chains 73, 74 and 75. The front of each support plate 72 with respect to the direction B is connected by one of the chains 73 to the annulus 69, said chain 73 being coupled to the support plate 72 concerned at a point very close to the lower flange of that support plate. The chain 73 is inclined forwardly with respect to the direction B from the support plate 72 to the annulus 69. The front of each support plate 72 with respect to the direction B is also connected by one of the chains 74 to the periphery of the plate 66 but, in this case, the chain 74 is coupled to the support plate 72 concerned at a point very close to the upper flange thereof. Each chain 74 is shorter than each chain 75 and is inclined rearwardly with respect to the direction B from the support plate 72 concerned to the plate 66. The third connection between each support plate 72 and the central region or hub 64 of the corresponding rake member 63 is afforded by one of the chains 75 which interconnects the rear end of that support plate 72 (with respect to the direction B) and one of the holes in the projection 71 of the adjustable ring 70. It will be noted from FIG. 12 of the drawings that each chain 75 is coupled to the corresponding support plate 72 at a level midway between the upper and lower flanges of that support plate. The chains 75 are substantially radially disposed with respect to the axes of the shafts 62 in the positions of adjustment thereof that are illustrated in the drawings.

The limbs of each support plate 72 have a greater horizontal extent in leading regions thereof with respect to the direction B than they do towards the rear ends of the support plates (see FIG. 11) and corresponding pairs of tines 76 that are formed integrally from single lengths of spring steel rod or other resilient material are carried by the plates 72 between the broader regions of their parallel limbs. The two tines 76 of each pair are vertically spaced apart from one another and helical coils 77 at their root ends are arranged turnably around corresponding substantially vertical pivot pins 78 that are entered through aligned holes in the upper and lower flanges of the support plates 72. The two helical coils 77 that correspond to each pair of tines 76 are integrally interconnected by a bend 79 (FIG. 12) that projects away from the associated pivot pins 78 to bear (at least during operation) against the web or base of the support plate 72 concerned (see FIG. 11). The upper end of each pivot pin 78 is provided, above the upper flange of the corresponding support plate 72, with a projecting lug 79A which is secured to the adjoining limb of the support plate 72 concerned by a small bolt or the like whose position can be seen in FIG. 13 of the drawings. If it should prove necessary to replace one pair of tines 76, all that is required is to remove temporarily the small bolt that has just been mentioned whereafter the pivot pin 78 concerned can be lifted axially clear of the corresponding support plate 72 thus freeing the worm or damaged tines 76. A new pair of tines 76 is installed merely by following the simple procedure just mentioned in reverse order.

The adjustable ring 70 can be turned angularly around the axis of the corresponding shaft 62 and can be retained in any chosen one of a plurality of different angular settings about that axis with the aid of a substantially vertical locking pin 80 that is provided with a split pin 81 or the like to ensure that vibration during operation does not displace the locking pin from its effective chosen position. It can be seen from FIG. 12 of the drawings that the locking pin 80 is passed downwardly through substantially vertically alinged holes in the periphery of the plate 66 and in an outer peripheral region of the annulus 69 and through a chosen hole in the intervening projection 71 of the adjustable ring 70. The particular hole in the projection 71 that is chosen determines tha angular setting of the adjustable ring 70 about the axis of the corresponding shaft 62 relative to the remainder of the central portion or hub 64 of the rake member 63 concerned. The effect of a displacement of the ring 70 in the way which has just been described is to turn each of the support plates 72 about a corresponding axis that is substantially parallel to the axis of the shaft 62 concerned. FIG. 11 of the drawings illustrates in full lines and broken lines two positions of one of the support plates 72 and its pair of tines 76 and chain 75 that correspond to two alternative angular settings of the ring 70 relative to the remainder of the central portion or hub 64 of the rake member 73 concerned. It will be appreciated that the angle of attack of the tines 76 is changed by performing the adjustment which has just been described and, as already discussed above, such alteration of the positions of all of the tines is most desirable when the machine is to change its mode of working from tedding or other crop spreading to swathforming or other crop collection or vice versa. The lowermost end of each shaft 62 is provided with a corresponding supporting member in the form of a dish plate 82 which is preferably, but not absolutely essentially, connected to the shaft 62 concerned by a rotary bearing so that it is not compelled to revolve in unison with its shaft 62. Each dish plate 82 is closed at the top by a complementary cover of inverted dish-shaped configuration. The rake members 63 bear upon the ground by way of the dish plates 82 during the operation of the machine.

The rear of the machine with respect to the direction A is provided with two guide members 84 for hay or other crop displaced by the machine, the two guide members 84 being turnable upwardly and downwardly about corresponding substantially horizontally aligned pivot pins 83 that extend substantially perpendicular to the direction A. The pivot pins 83 are carried by supporting strips 85 whose opposite ends are secured to the respective frame beam 60 in the manner that can be seen in FIG. 10 of the drawings and by the opposite ends of a single supporting strip or bracket 86 whose center is belted to the rear of a gear box 87 located midway along the length of the hollow main frame beam 58. The crop guide members 84 can turn freely upwardly and downwardly about the horizontally spaced apart pivot pins 83 but excessive downward movements thereof about those pins are prevented by the relatively facing free rearmost ends of the frame beams 60 which, as will be seen in FIG. 10 of the drawings, are located in the paths of donward movement of the members 84. The crop guide members 84 are not employed in tedding and most other crop spreading operations and, at such times, they are turned upwardly through substantially 180° about their pivot pins 83 until they come to rest in inverted inoperative positions in which they bear downwardly upon the strengthening strips 61A.

In the use of the machine which has been described with reference to FIGS. 10 to 13 of the drawings, its two rake members 63 are rotated in the opposite directions B that are indicated by arrows in FIG. 10 by a drive transmission which is similar to that already described in connection with FIGS. 1 to 4 of the drawings. To this end, an intermediate telescopic transmission shaft 87A that is of a construction which is known per se and which has universal joints at its opposite ends is arranged in driving connection between the power take-off shaft at the rear of the agricultural tractor of other vehicle which is employed to operate the machine and a forwardly projecting rotary input shaft of the gear box 87. Centrifugal forces cause the support plates 72 and their tines 76 to adopt substantially the positions thereof that are illustrated in FIGS. 10 to 13 of the drawings and the hay or other crop that is engaged by the tines 76 is moved rearwardly of the direction A by those tines through a central region located between the two rake members 63. Each support plate 72 and its corresponding tines 76 are capable of deflecting independently of all the other similar assemblies both radially and upwardly and downwardly. The support plates 72 are of such a size that they constitute wall segments comparable with those of the preceding embodiments, said wall segments again surrounding the axes of the corresponding shafts 62 in the form of a substantially, but not completely, closed ring. The wall segments perform a mutual screening action in the central region between the two rake members 63 so that crop displaced by one rake member does not interfere with the operation of the other rake member and a uniform raking effect is produced. Adjustment of the angle of attack of the tines 76 for different modes of operation of the haymaking machine is effected in the manner discussed above by angularly displacing the two adjustable rings 70 about the axes of the shafts 62 relative to the remainders of the central portions or hubs 64 of the two rake members 63. The machine is lifted clear of the ground for inoperative transport purposes by raising the three-point lifting device or hitch of the agricultural tractor or other operating vehicle to which the coupling member 61 is connected. The two rake members 63 are then rotationally at rest and the support plates 72 and their tines 76 hang downwardly on the chains 73, 74 and 75 but not so far that they will contact the ground surface under these conditions.

FIGS. 14 to 16 of the drawings illustrate a haymaking machine which is basically similar to the machine that has already been described with reference to FIGS. 1 to 4 of those drawings and, as a consequence, parts which are similar or identical to parts that have already been described with reference to FIGS. 1 to 4 are denoted in FIGS. 14 to 16 by the same references as are employed in the former Figures. Each of the two rake members 10 again comprises four groups of tines each of which groups has two pairs of tines 25 that are located one behind the other with respect to the corresponding directions B. The tines 25 are again inclined downwardly, and rearwardly with respect to the corresponding directions B, from their root ends to their tips, said tines 25 being indirectly connected to support portions 91 in such a way that the angle of attack of the tines can be changed, as may be required, to match the particular mode of operation of the haymaking machine which is needed. The previously described lugs 16 are replaced by lugs 16A that are provided with convergent extensions 92 whose radially outer ends are secured to corresponding shafts 93. The previously described supporting members 20 are replaced by supporting members 90 which are very similar to the supporting members 20 in that they comprise outwardly divergent leading and rear (with respect to the corresponding directions B) arms 88 and 89 that are integrally interconnected by bends but, in this case, the outwardly facing concave side of each interconnecting bend has the root end of a corresponding one of the shafts 93 rigidly secured to it. Also, in this case, the general plane of each supporting member 90 is inclined to the horizontal during operation in such a way that the outer ends of the arms 88 and 89 are located at a higher level than is the corresponding pivot pin 15. The shafts 93 are oppositely inclined to the horizontal (see FIG. 16) in such a way that their junctions with the corresponding supporting members 90 are located at higher horizontal levels than are the ends thereof remote from those junctions.

The end of each shaft 93 that is remote from its junction with the corresponding supporting member 90 is provided with a stub shaft 94 upon which a spherical supporting member 95, which may be considered as being a wheel, is rotatably mounted. The supporting members or wheels 95 are disposed substantially, although not exactly, midway between the arms 88 and 89 of the corresponding supporting members 90 (see FIGS. 14 and 15). The supporting members 90 occupy substantially the positions shown in the drawings during the operation of the machine at which time the two rake members 10 bear upon the ground surface by way of their ground wheels 26 (FIG. 3). The tines 25 of each rake member 10 are arranged in four groups each of which comprises two pairs of the tines 25 that are located one behind the other with respect to the corresponding direction B. Each group of tines is supported by the arms 88 and 89 of the corresponding member 90 and also bears upon the ground surface by way of its spherical supporting member or wheel 95, that member or wheel 95 being arranged to follow undulations in the surface of the ground over which the machine is travelling so that the tines 25 of the corresponding group are raised or lowered as a consequence. Each group of tines 25 can thus match undulations in the ground surface over which the haymaking machine is travelling very accurately and independently of all the other groups of tines. As in the embodiment of FIGS. 1 to 4 of the drawings, upward and downward movements of each group of tines 25 are accomplished by pivoting of the corresponding supporting members 90 about the substantially horizontal axes that are afforded by the pivot pins 15 which pivot pins, of course, have the same length characteristics relative to the dimensions of the supporting members 90 as have already been discussed above in relation to the supporting members 20. The spherical supporting members or wheels 95 rotate around their stub shafts 94 during progress over the ground in the direction A, and simultaneously in the direction B, and it will be noted from FIG. 15 of the drawings that, as seen in plan view, each stub shaft 94 is substantially radially disposed with respect to the axis of the corresponding shaft 8.

The angle of attack of the tines 25 can be changed in a manner which is known per se and which is not illustrated in detail in the drawings so as to be suitable for the particular mode of operation of the machine that is required and the machine of FIGS. 14 to 16 of the drawings may also be provided with wall segments, such as the wall segments 21 of FIGS. 1 to 4 of the drawings, arranged in the form of a substantially, but not completely, closed ring around each of the shafts 8. Such wall segments are not, however, illustrated in FIGS. 14 to 16 of the drawings. The machine is brought to an inoperative transport position in which its width is appreciably reduced as compared with its illustrated operative position by tilting each supporting member 90 and the parts which it carries upwardly about the axis of the corresponding pivot pin 15. Although not illustrated, it is also possible to arrange at least one spring between the supporting member 90 of each tine group and the central region or hub 9 of the corresponding rake member 10 so that said springs will tend to retract the tine groups automatically when the rake members are rotationally at rest but will be overcome by centrifugal forces during operation of the machine so that the tine groups will reach operative positions substantially corresponding to those illustrated in FIGS. 14 to 16 of the drawings.

Although various features of the haymaking machines that have been described and that are illustrated in the accompanying drawings will be set forth in the following claims as inventive features, it is emphasised that the invention is not necessarily limited to those features and that it includes within its scope each of the parts of each haymaking machine that has been described, and/or illustrated in the accompanying drawings, both individually and in various combinations.

What we claim is:

1. A haymaking machine comprising at least one rake member having a central portion rotatable about an upwardly extending axis, supports connected to said central portion by respective pivot means and said supports normally extending outwardly from said central portion and defining an outer circumference of the rake members, tines mounted on each of said support and said tines being movable together with the corresponding support in vertical directions relative to the central portion to follow ground undulation during rotation, the tines on said supports being spaced apart and spanning a given circumferential angle along said outer circumference of rake member, each of said supports being vertically movable as an independent unit about said pivot means, and comprising at least two lines that are positioned one behind the other with respect to the normal direction of rotation of said rake member.

2. A haymaking machine according to claim 1, wherein a ground wheel is mounted on at least one of said supports and said wheel is rotatable about an axis inclined to both horizontal and vertical directions.

3. A haymaking machine according to claim 2, wherein the axis of rotation of said ground wheel extends substantially perpendicular to the normal direction of straight forward travel of said machine when the latter is veiwed in plan.

4. A haymaking machine according to claim 1, wherein each support includes outwardly extending arms pivoted to said central portion and said arms are movable about a common substantially horizontal pivot axis.

5. A haymaking machine according to claim 4, wherein said arms comprise portions that have outer free ends and said tines are mounted in groups at said outer free ends, said arm portions being oriented rearwardly and upwardly with respect to the normal direction of rotation of said rake member.

6. A haymaking machine according to claim 1, wherein pairs of tines are mounted on each support and said support comprises arms located one behind the other with respect to the normal direction of rotation of said rake member, said arms being convergent in a direction towards said central portion.

7. A haymaking machine according to claim 6, wherein each support includes a corresponding wall segment that extends along the circumference of the rake member.

8. A haymaking machine according to claim 1, wherein a substantially spherical ground wheel is connected to the central portion of said rake member and the latter is sustained above the ground by said ground wheel, said ground wheel having an axis of rotation that extends between the horizontal and the vertical directions.

9. A haymaking machine comprising at least one rake member having a central portion rotatable about an upwardly extending axis, a plurality of supports located around the central portion and defining separate segments of an outer circumference of said member, tines on each of said supports and said supports being vertically displaceable relative to said central portion and the remainder of said supports to follow ground undulations during operation, each of said supports being mounted on spaced apart arms that extend outwardly from pivot connections to said central portion and said arms being freely pivotable together with said spports in vertical directions responsive to contact with the ground.

10. A haymaking machine comprising a rake member having a central portion rotatable about an upwardly extending axis, a plurality of support members located around said central portion and forming segments of an outer circumference of the rake member, tine groups on said support members being positioned one behind the other along said circumference, each support member being independently pivoted to said central portion and pivotable about a substantially horizontal axis, each of said support members and its corresponding tine groups spanning a given angle of said circumference, at least one of said support members being mounted on a corresponding ground wheel and said wheel being positioned between said central portion and the outer circumference of the rake member.

11. A haymaking machine comprising at least one rake member having a central portion rotatable about an upwardly extending axis, tined spports located around said central portion defining an outer circumference of said members, each tined support being pivoted to said central portion by at least two arms and vertically displaceable with those arms to follow ground undulations during operation, said two arms being spaced apart around said central portion and extending outwardly from that portion during operation, said supports having outer free ends and tines connected to said ends, said tines extending rearwardly with respect to the normal direction of rotation of said rake member.

12. A haymaking machine comprising at least one rake member having a central portion rotatable about an upwardly extending axis, tines supports located around said central portion defining an outer circumference of said member, each tined support being pivoted to said central portion by at least two arms and vertically displaceable with those arms to follow ground undulations during operation, said two arms being spaced apart around said central portion and extending outwardly from that portion during operation, said supports having outer free ends and tines connected to said ends, said ends being oriented upwardly during operation.

13. A haymaking machine comprising a rake member having a central portion rotatable about an upwardly extending axis, a plurality of tined supports positioned around the central portion and said supports being independently pivoted to that portion and pivotable about substantially horizontal axes, at least one tine mounted on each support and said support comprising a wall segment that defines a given angle of an outer circumference of said rake member, the walled segments being located adjacent one another and forming a substantially enclosed ring that defines said circumference.

14. A haymaking machine according to claim 13, wherein each wall segment is arcuately curved and has a center of curvature substantially coincident with the axis of rotation of said rake member, said tines extending radially outwardly from said wall segments.

15. A haymaking machine according to claim 13, wherein a lower region of each wall segment has a support portion that contacts the ground during operation.

16. A haymaking machine according to claim 15, wherein the support portions of said segments are elongated in configuration and fastened to corresponding wall segments at only one end thereof.

17. A haymaking machine according to claim 15, wherein each wall segment comprises a plurality of rods that are located in superposed spaced relationship and the center line of each rod is contained in a plane parallel to similar planes containing the center lines of the other rods and the center line of the corresponding support portion.

18. A haymaking machine comprising a rake member having a central portion that is rotatable about an upwardly extending axis, a plurality of tine supports being pivotally connected to said central portion with flexible but inextensible members and each of said supports having at least one tine, said support being displaceable vertically and radially outwardly with respect to the central portion, said supports being positioned around said central portion and defining an outer circumference of the rake member, each of said supports extending along and occupying a given angle of said circumference.

19. A haymaking machine according to claim 18, wherein a plurality of said flexible members connect each tine support to said central portion at both the front and rear of that support with respect to the normal direction of rotation of the rake member.

20. A haymaking machine according to claim 19, wherein the front of each tine support is connected to said central portion by two flexible but inextensible members and the latter are coupled to a top and a bottom region thereof respectively, the lowermost of said two flexible members being oriented to extend forwardly and the uppermost of said two flexible members being oriented to extend rearwardly with respect to the normal direction of rotation.

21. A haymaking machine according to claim 20, wherein a flexible member interconnects the rear of each tine support, with respect to the normal direction of rotation of said rake member, an adjustable ring on said central portion and said ring being angularly turnable above the axis of rotation of said rake member, whereby upon effecting an angular turn of said ring, said tine support is turned about an axis which is substantially parallel to said axis of rotation.

22. A haymaking machine according to claim 19, wherein each flexible member is contained in a plane that is substantially perpendicular to the axis of rotation of said rake member when the latter is revolving at an operational speed as a consequence of centrifugal forces.

23. A haymaking machine according to claim 18, wherein each tine support is a support plate of channel-shaped cross-section, limbs of said support projecting outwardly with respect to the axis of rotation of said rake member away from a center web thereof, when said rake member is revolving at an operative speed, at least one tine being secured between the limbs of said support plate.

24. A haymaking machine according to claim 23, wherein tines are mounted on a pivot pin that extends between the limbs of each support plate and incorporate helical coils that are wound around said pivot pins, stop means on said plates that limits turns of said tines about the pivot pin in at least one direction.

25. A haymaking machine according to claim 24, wherein said tines are in pairs and said stop means includes at least one connecting portion between the helical coil corresponding to each pair of tines, said pair of tines, their helical coils and the corresponding connecting portion being formed integrally.

* * * * *